UNITED STATES PATENT OFFICE.

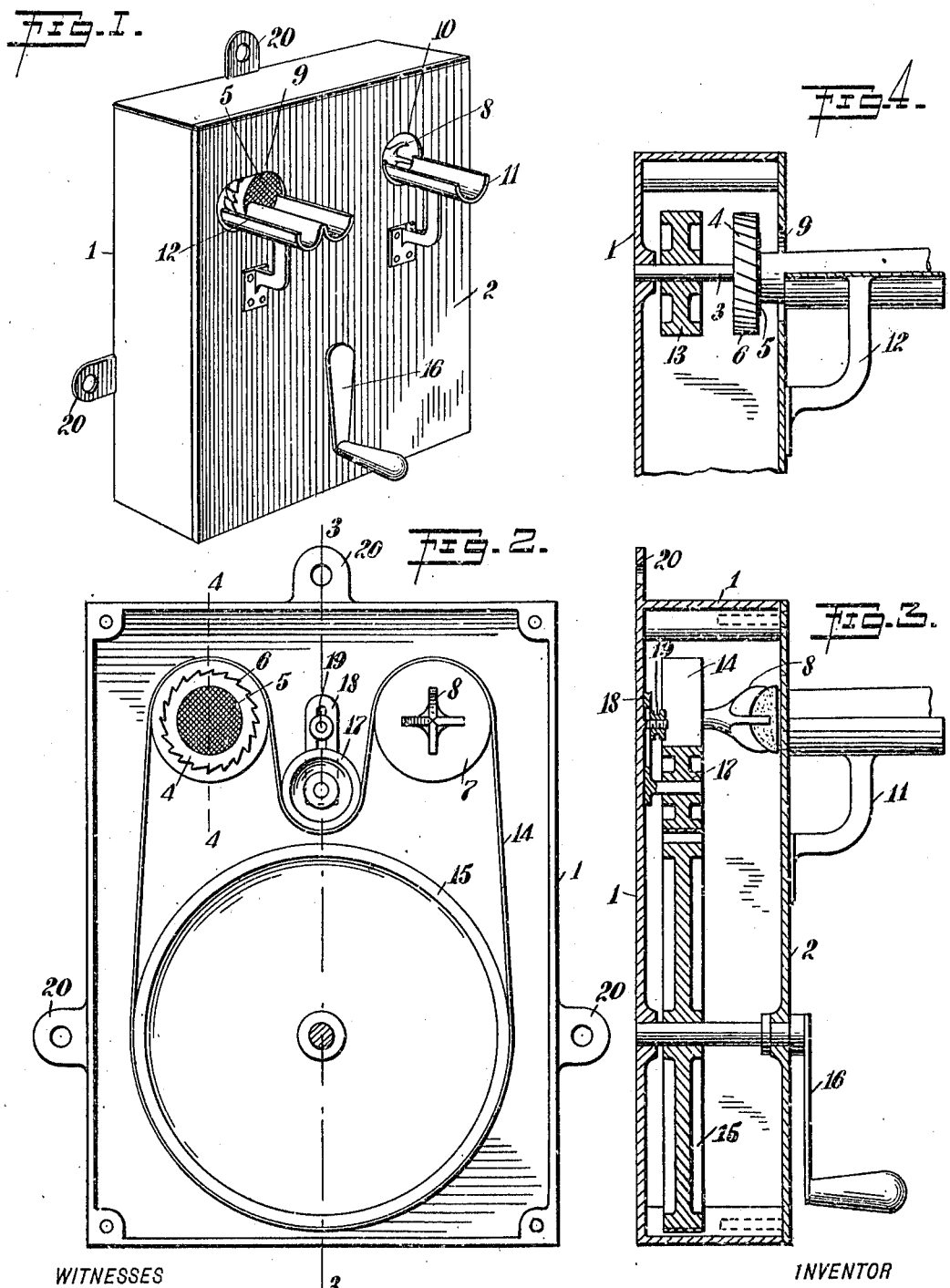

GEORGE MAHONEY, OF IOWA CITY, IOWA, ASSIGNOR OF ONE-HALF TO MILBERT F. PRICE, OF IOWA CITY, IOWA.

CUE-TIPPING MACHINE.

955,819.   Specification of Letters Patent.   Patented Apr. 19, 1910.

Application filed July 31, 1909. Serial No. 510,654.

*To all whom it may concern:*

Be it known that I, GEORGE MAHONEY, a citizen of the United States, and a resident of Iowa City, in the county of Johnson and State of Iowa, have invented a new and Improved Cue-Tipping Machine, of which the following is a full, clear, and exact description.

This invention relates to a new and improved machine for forming and trimming the tip of a cue or the like.

The object of the invention is to provide a device which will be simple in construction, easily manipulated, inexpensive to manufacture, and quick and accurate in its operation.

The device consists, generally speaking, of a plurality of cutting, trimming and filing wheels, driven by a suitable means and juxtaposed to suitable work-supports or rests.

The device further consists in the construction and combination of parts, to be more fully described hereinafter and particularly set forth in the claims.

Reference is to be had to the accompanying drawings forming a part of this specification, in which similar characters of reference indicate corresponding parts in all the views, and in which—

Figure 1 is a perspective view of my device; Fig. 2 is a front view in elevation, with the cover removed; Fig. 3 is a vertical transverse section on the line 3—3 in Fig. 2; and Fig. 4 is a fragmentary vertical transverse section on the line 4—4 in Fig. 2.

Referring more particularly to the separate parts of the device, 1 indicates a casing or support, which may be of any suitable form and is adapted to close by a front plate 2. Rotatably supported near the top of the casing 1, there is provided a shaft 3, which has secured on the outer end thereof in any suitable manner, a wheel 4. The face of the wheel 4 is provided with a roughened or filing surface 5, and the periphery of said wheel is provided with suitably inclined cutting teeth 6.

At a suitable interval from the shaft 3, there is rotatably supported in the casing 1, another shaft, to which is secured a pulley 7. This pulley 7 has removably secured centrally thereof, a bur or trimmer 8, which is preferably in the form of a concave metal tool having a plurality of curved cutting fingers.

The front plate 2 is provided with openings 9 and 10, located adjacent the faces of the wheel 4 and the bur 8. Located opposite the opening 10, there is provided a suitable work-support or rest 11, which is secured in any well known manner to the front plate 2. There is also provided a double work-support or rest 12 opposite the opening 9, which is for the purpose of supporting the cue in contact with either the file face 5 or the cutting periphery 6.

The shaft 3 has secured thereon between the casing 1 and the wheel 4, a suitable pulley 13, which is similar to the pulley 7. The pulleys 13 and 7 are driven by means of a suitable belt 14 from a large pulley 15, which may be driven by any suitable motive means, such as a hand-crank 16. The tension of the belt 14 is regulated by means of an idle pulley 17, which is adjustably secured in any well-known manner, as by means of a slotted bracket 18 and a thumb-screw 19, to the casing 1. The whole casing or support 1 may be secured to a suitable wall or other support by means of brackets 20.

The method of using the device will now be described. The damaged cue with the tip broken off, which it is desired to replace, is placed on the rest 12 opposite the file face on the wheel 4. The wheel 4 is then rotated rapidly by any suitable motive means, such as the hand crank 16, and the glue or cement removed, and the end of the cue finished off smooth. The rough tip of the cue is then cemented onto the cue. After drying, the rough tip is inserted into the sphere of rotation of the concave bur 8, and the pulley 7 rotated by means of the hand crank. The rapid rotation of the bur 8 forms a convex surface on the cue tip. The tip, thus partially finished, is next placed in the sphere of action of the cutting teeth on the periphery 6, which trims off the rough side edges of the cue tip and puts the finishing touches on it. If desired, however, the file surface 5 may be also used in finishing the cue tip, by placing the cue at an angle in the opening 9.

Having thus described my invention, I claim as new and desire to secure by Letters Patent:—

1. In a cue tipping machine, the combination with a support, comprising a casing having a plurality of openings therein, a tool juxtaposed to one of said openings, a work-support for said tool, a compound tool juxtaposed to another of said openings, a work-support for each member of said compound tool, and means for driving said tools.

2. In a cue tipping machine, the combination with a support, comprising a casing having a plurality of openings therein, of a rotary tool juxtaposed to one of said openings, a work support for said tool, a rotary compound tool juxtaposed to another of said openings, a work-support for each member of said compound tool, and rotary means for driving said tools.

3. In a cue tipping machine, the combination with a support, comprising a casing having a plurality of openings therein, of a shaft rotatably secured in said casing and opposite one of said openings, a tool secured to said shaft, driving means on said shaft, a work-support juxtaposed to said tool, a shaft journaled in said casing juxtaposed to another of said openings, driving means on said last-mentioned shaft, a compound tool on said last-mentioned shaft, a plurality of work-supports for said compound tool, and means for driving said driving means from a common source.

4. In a cue tipping machine, the combination with a support, comprising a casing having a plurality of openings therein, of a shaft rotatably secured in said casing opposite one of said openings, a tool secured to said shaft, a pulley on said shaft, a work-support juxtaposed to said tool, another shaft journaled in said casing in juxtaposition to another of said openings, a compound tool on said last-mentioned shaft, a plurality of work-supports for said compound tool, a power shaft journaled in said casing, a pulley on said power shaft, and a driving belt connecting said pulleys.

5. In a cue tipping machine, the combination with a support, of a plurality of work-supports connected to said support, a compound tool juxtaposed to said work-supports and comprising a rotatable wheel having an integral filing face and a periphery composed of inclined cutting teeth, and means for driving said compound tool.

In testimony whereof I have signed my name to this specification in the presence of two subscribing witnesses.

GEORGE MAHONEY.

Witnesses:
MATTIE A. DAVIS,
M. F. PRICE.